(12) United States Patent
Kanegae et al.

(10) Patent No.: US 11,117,536 B2
(45) Date of Patent: Sep. 14, 2021

(54) PASSENGER PROTECTION APPARATUS

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 44 days.

(21) Appl. No.: 16/742,067

(22) Filed: Jan. 14, 2020

(65) Prior Publication Data

US 2020/0298780 A1   Sep. 24, 2020

(30) Foreign Application Priority Data

Mar. 19, 2019   (JP) .............................. JP2019-051685

(51) Int. Cl.
 B60R 21/015   (2006.01)
 B60R 21/0132   (2006.01)
 (Continued)

(52) U.S. Cl.
 CPC ............ B60R 21/013 (2013.01); B60N 2/002 (2013.01); B60N 2/02 (2013.01); B60N 2/0276 (2013.01);
 (Continued)

(58) Field of Classification Search
 CPC ... B60R 21/013; B60R 21/206; B60R 21/015; B60R 21/01512; B60R 21/207; B60R 21/231; B60R 21/01552; B60R 21/2338; B60R 21/01554; B60R 21/205; B60R 21/01562; B60R 21/0156; B60R 21/01558; B60R 21/0132; B60R 21/01504;
 (Continued)

(56) References Cited

U.S. PATENT DOCUMENTS 5,670,853 A * 9/1997 Bauer .................... B60N 2/002
                                                        180/273
6,170,865 B1 * 1/2001 Barron ................. B60N 2/0276
                                                        280/735

(Continued)

FOREIGN PATENT DOCUMENTS

JP          2013-014176 A      1/2013

*Primary Examiner* — Keith J Frisby
(74) *Attorney, Agent, or Firm* — Smith, Gambrell & Russell, LLP

(57) ABSTRACT

A passenger protection apparatus for a vehicle includes first and second airbags, an airbag deployment device, a collision speed detector, a passenger's position detector, a seat moving unit, an airbag deployment determination unit, and a deployment controller. The first airbag is deployable in different sizes. The second airbag is deployable between the first airbag and vehicle equipment. The airbag deployment device deploys the airbags. The collision speed detector detects a collision or collision possibility of a vehicle, and calculates a collision speed. The passenger position detector detects a position of a passenger sitting on a seat. The seat moving unit moves the seat. The airbag deployment determination unit determines a size of the deployed first airbag. The deployment controller determines an amount of movement of the seat, causes the seat moving unit to move the seat, and causes the airbag deployment device to deploy the airbags.

7 Claims, 4 Drawing Sheets

(51) Int. Cl.
*B60R 21/206* (2011.01)
*B60R 21/013* (2006.01)
*B60N 2/00* (2006.01)
*B60R 21/207* (2006.01)
*B60R 21/231* (2011.01)
*B60N 2/02* (2006.01)
*B60R 21/205* (2011.01)
*B60R 21/263* (2011.01)
*B60R 21/00* (2006.01)
*B60R 21/01* (2006.01)

(52) U.S. Cl.
CPC ...... *B60R 21/01512* (2014.10); *B60R 21/206* (2013.01); *B60R 21/207* (2013.01); *B60R 21/231* (2013.01); *B60R 21/0132* (2013.01); *B60R 21/01562* (2014.10); *B60R 21/205* (2013.01); *B60R 2021/0004* (2013.01); *B60R 2021/01225* (2013.01); *B60R 2021/01238* (2013.01); *B60R 2021/23107* (2013.01); *B60R 2021/23169* (2013.01); *B60R 2021/2633* (2013.01)

(58) Field of Classification Search
CPC ........... B60R 2021/23169; B60R 2021/23107; B60R 2021/23382; B60R 2021/23386; B60R 2021/01238; B60R 2021/01225; B60R 2021/23384; B60R 2021/2633; B60R 2021/2636; B60R 2021/0004; B60R 2021/0032; B60R 2021/01204; B60R 2021/01211; B60R 2021/23388; B60N 2/002; B60N 2/00; B60N 2/02; B60N 2/0276; B60N 2/42; B60N 2/4221; B60N 2/427; B60N 2/42727; B60N 2/42736
USPC ............... 280/735, 732, 730.1, 743.1, 743.2; 296/68.1; 701/45, 49
See application file for complete search history.

(56) References Cited

U.S. PATENT DOCUMENTS

| | | | | |
|---|---|---|---|---|
| 6,227,563 | B1 * | 5/2001 | Talisman | B60N 2/002 280/735 |
| 6,240,352 | B1 * | 5/2001 | McCurdy | B60N 2/002 280/735 |
| 6,250,677 | B1 * | 6/2001 | Fujimura | B60R 21/233 280/730.1 |
| 6,916,040 | B1 * | 7/2005 | Levine | B60K 23/02 280/735 |
| 6,918,611 | B1 * | 7/2005 | Winters | B60R 21/233 280/735 |
| 8,434,819 | B2 * | 5/2013 | Guerrero | B60N 2/4221 297/216.16 |
| 8,678,429 | B2 | 3/2014 | Nagasawa et al. | |
| 9,352,671 | B1 * | 5/2016 | Enders | B60N 2/0722 |
| 9,676,296 | B2 * | 6/2017 | Denne | B60N 2/929 |
| 2006/0001298 | A1 * | 1/2006 | Tsuruta | B60N 2/42745 297/216.16 |
| 2013/0001934 | A1 | 1/2013 | Nagasawa et al. | |

* cited by examiner

PASSENGER PROTECTION APPARATUS

CROSS-REFERENCE TO RELATED APPLICATIONS

The present application claims priority from Japanese Patent Application No. 2019-051685 filed on Mar. 19, 2019, and the entire contents of which are hereby incorporated by reference.

BACKGROUND

The disclosure relates to a passenger protection apparatus.

In order to protect a passenger from a collision and so forth, an airbag apparatus has been used as a passenger protection apparatus in a vehicle such as an automobile This airbag apparatus typically includes an impact sensor, an inflator, an airbag, a controller, and so forth. When the impact sensor detects the impact of a collision such as a front collision, the airbag apparatus outputs a detection signal to the controller; the controller sends an operation signal to the inflator; and the inflator generates gas and supplies the gas to the airbag. Upon receiving the gas from the inflator, the airbag instantaneously expands and deploys in front of a passenger. By this means, the airbag with an inner gas pressure receives the body of the passenger moving forward due to the impact, and deflates absorbing the energy of the motion of the passenger. In this way, the airbag can absorb the sudden forward movement of the passenger due to the impact of the front collision of the vehicle, and therefore it is possible to secure the safety of the passenger.

Here, there has been proposed an airbag apparatus including a weight sensor configured to detect the weight of a passenger, and a gas discharge port configured to discharge part of the gas generated in the inflator to the outside, in addition to the impact sensor, the inflator, the airbag, and the controller, which is disclosed, for example, in Japanese Unexamined Patent Application Publication No. 2013-014176. With this airbag apparatus, when a passenger sits on a driver's sheet or the seat next to the driver, the weight sensor detects the weight of the passenger and outputs a detection signal to the controller; and the controller adjusts the size of the gas discharge port of the inflator, based on the detection signal from the weight sensor.

When a front collision of the vehicle occurs, gas is generated by the inflator at a predetermined pressure, and part of the gas leaks out of the gas discharge port, so that the pressure of the gas introduced into the airbag, which is used to deploy the airbag, is reduced. By this means, it is possible to adjust the pressure to deploy the airbag depending on the weight of the passenger.

SUMMARY

An aspect of the disclosure provides a passenger protection apparatus for a vehicle. The apparatus includes a first airbag, a second airbag, an airbag deployment device, a collision speed detector, a passenger's position detector, a seat moving unit, an airbag deployment determination unit, a deployment controller. The first airbag is deployable in different sizes. The second airbag is deployable between the first airbag and vehicle equipment. The airbag deployment device is configured to deploy the first airbag and the second airbag. The collision speed detector is configured to detect a collision or collision possibility of the vehicle, and calculate a collision speed. The passenger's position detector is configured to detect a position of a passenger sitting on a seat. The seat moving unit is configured to move the seat. The airbag deployment determination unit is configured to determine a size of the deployed first airbag based on a result of the detection by the collision speed detector. The deployment controller is configured to determine an amount of movement of the seat based on the size of the deployed first airbag determined by the airbag deployment determination unit and the position of the passenger detected by the passenger's position detector, cause the seat moving unit to move the seat, and cause the airbag deployment device to deploy the first airbag and the second airbag.

An aspect of the disclosure provides a passenger protection apparatus for a vehicle. The apparatus includes a first airbag, a second airbag, a seat moving unit, and circuitry. The first airbag is deployable in different sizes. The second airbag is deployable between the first airbag and vehicle equipment. The seat moving unit is configured to move a seat. The circuitry is configured to deploy the first airbag and the second airbag. The circuitry is configured to detect a collision or collision possibility of the vehicle, and calculate a collision speed. The circuitry is configured to detect a position of a passenger sitting on the seat. The circuitry is configured to determine a size of the deployed first airbag based on a result of the detection. The circuitry is configured to determine an amount of movement of the seat based on the determined size of the deployed first airbag and the detected position of the passenger, cause the seat moving unit to move the seat, and cause the airbag deployment device to deploy the first airbag and the second airbag.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
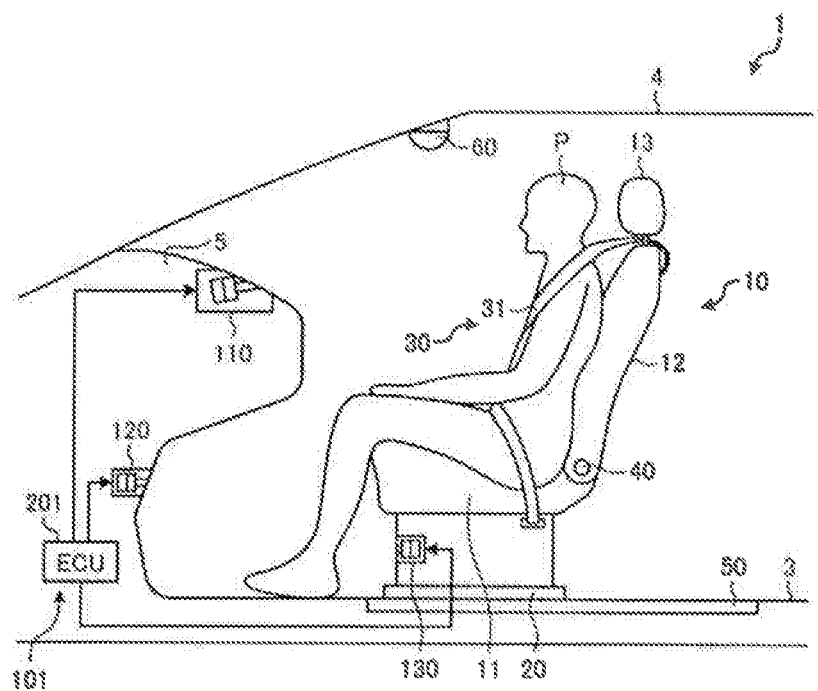
FIG. 1 is a cross-sectional view schematically illustrating part of a vehicle equipped with a passenger protection apparatus according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

With a conventional airbag apparatus, the collision speed and the sitting position of the passenger are fixed as preset values such as an average value, and therefore various speeds and sitting positions other than the fixed ones are not necessarily covered. In addition, the physical feature such as a body type of the passenger varies by individual, and the collision situation changes in each case, and therefore it is not possible to absorb the impact at a fixed passenger's position only by changing the inner pressure of the airbag. For example, an excessive increase in the inner pressure of the airbag makes a high impact on the passenger when the passenger contacts the airbag. In contrast, an excessive decrease in the inner pressure makes the airbag impossible to sufficiently absorb the impact on the passenger. As described above, it is difficult for conventional airbags to deploy optimally for various collision speeds. To address this problem, it is conceivable to change the size of the airbag depending on the collision situation. However, an increase in the size of the airbag needs space to deploy the airbag. Then, when the deployment space is increased, and the size of the airbag is increased simply in the direction to cover the upper body of the passenger, the gap between the passenger and vehicle equipment such as an instrument panel and a dashboard is widened, and therefore the airbag drops down, or spreads in the gap during the absorption of the impact. Consequently, it may not be possible to surely receive the reaction force. Here, when the entire gap is filled with one airbag, there needs a large inflator capable of flowing the gas into the airbag at a high speed, in order to instantly flow a large amount of gas into the airbag.

It is desirable to provide a passenger protection apparatus capable of appropriately deploying airbags depending on the collision speed to protect the passenger depending on the situation.

Figure 2A:
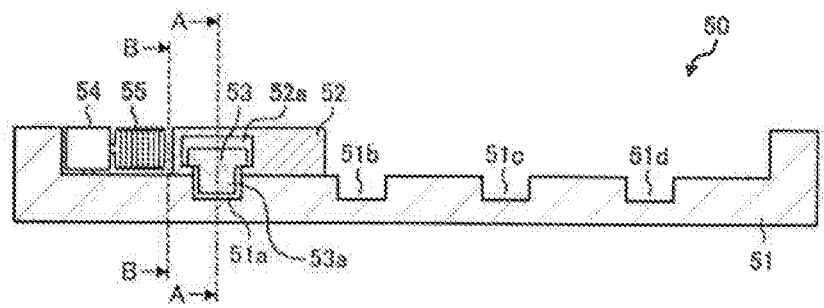
FIGS. 2A to 2C are cross-sectional views schematically illustrating a seat moving device.
Figure 2B:
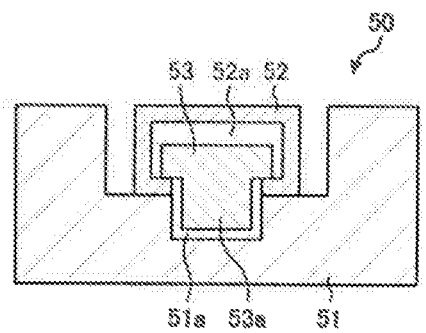
Figure 2C:
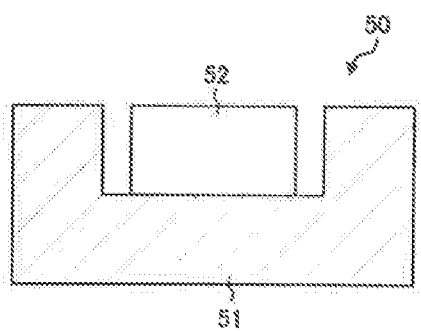
Figure 3A:
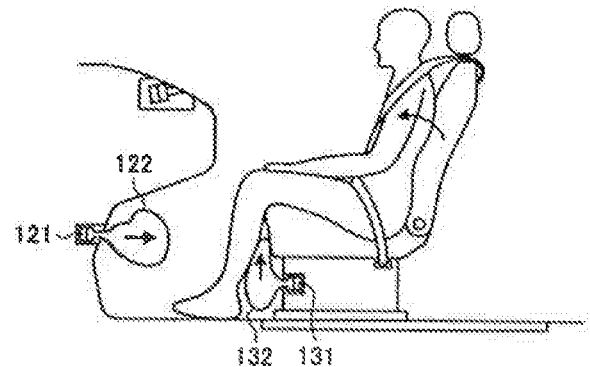
FIGS. 3A to 3C are side views illustrating states where the passenger protection apparatus is actuated.
Figure 3B:
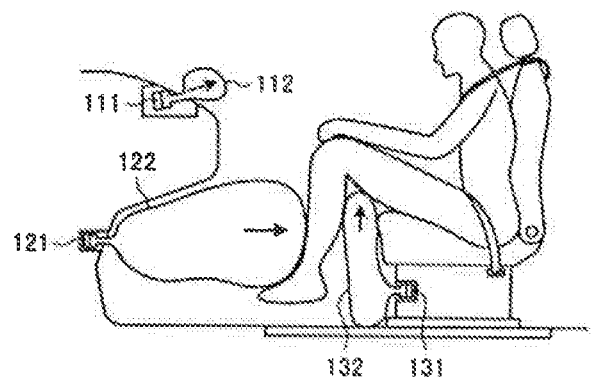
Figure 3C:
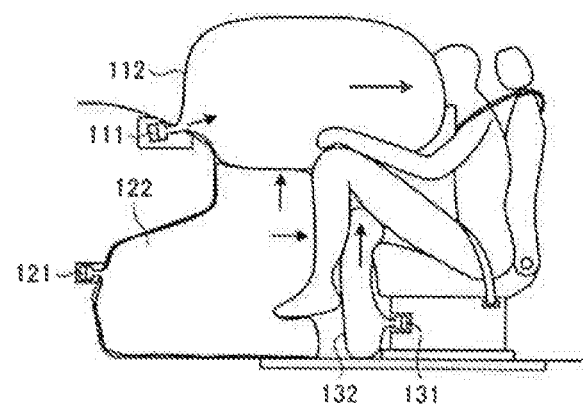

FIG. 1 is a cross-sectional view schematically illustrating part of a vehicle equipped with a passenger protection apparatus according to an embodiment of the disclosure. FIGS. 2A to 2C are cross-sectional views schematically illustrating a seat moving device configured to allow a seat to be moved according to the embodiment. FIGS. 3A to 3C are side views illustrating states where the passenger protection apparatus is actuated and airbag bodies are deployed. Here, FIG. 3A is a side view illustrating a state where an under-leg airbag body is deployed; FIG. 3B is a side view illustrating a state where a knee airbag body is deployed; and FIG. 3C is a side view illustrating a state where an upper body airbag body is deployed.

<Configuration of Vehicle 1>

As illustrated in FIG. 1, a passenger compartment of a vehicle 1 includes an under floor 3 provided in its lower part and a roof 4 provided in its upper part. A seat 10 is provided on the under floor 3.

A passenger P of the vehicle 1 sits on the seat 10. The seat 10 includes a seat, cushion (seat bottom) 11 on which the hip and thighs of a passenger P rest, a seat back (backrest) 12 configured to recline, and a head rest (head portion) 13 configured to support the head of the passenger P.

In addition, the seat 10 is provided with a seat slider 20. The seat slider 20 allows the position of the seat 10 to be adjusted back and forth by the operation of the passenger P. Alternatively, the seat slider 20 may allow the position of the seat 10 to be automatically adjusted back and forth without the operation of the passenger P. Here, the position of the seat 10 is determined, and this position is used as the position of the passenger P sitting on the seat 10 as described later. Moreover, the vehicle 1 is equipped with a passenger protection apparatus 101.

<Configuration of Passenger Protection Apparatus 101>

The passenger protection apparatus 101 includes a seat belt device 30, a posture correction device 40, seat moving device 50, a car-mounted camera 60, an upper body airbag device 110, a knee airbag device 120, an under-leg airbag device 130, and an electronic control unit (hereinafter referred to as "ECU") 201. Here, the upper body airbag device 110 and the knee airbag device 120 are provided in the dashboard 5. Meanwhile, the under-leg airbag device 130 is provided in the seat 10. In one embodiment, the ECU 201 may serve as a "collision speed detector" configured to detect a collision and collision possibility of the vehicle 1 and to calculate the collision speed, and an airbag deployment control unit (hereinafter referred to as "ACU") that may serve as a "deployment controller". In one embodiment, the ECU 201 may also serve as an "airbag deployment device". Here, the collision speed detector and the ACU may be provided separately from the ECU 201.

<Seat Belt Device 30>

The seat belt device 30 includes a webbing 31, a retractor, a wrap anchor, a shoulder anchor, a tang, and a buckle (not illustrated). The webbing 31 is a kind of belt. One end of the webbing 31 is fixed to the wrap anchor provided on the lower part of the seat 10, and the other end of the webbing 31 is wound up by the retractor provided in the seat back 12 via the shoulder anchor.

The tang is a T-shaped connecting fitting to couple to the buckle. In addition, the tang has an insertion hole in which the webbing is inserted 31, and is configured to be able to slide on the webbing 31. The buckle is a coupling part to which the tang is removably coupled, and provided on one side of the seat cushion 11 of the seat 10 facing the inside of the vehicle width direction (the center side of the vehicle 1).

When the ECU 201 detects a collision, the retractor of the seat belt device 30 winds up the webbing 31 to draw the passenger P to the seat 10 (seat back 12 side). In addition, when the ECU 201 detects collision possibility, the retractor of the seat belt device 30 also winds up the webbing 31. Here, the seat belt device 30 may change the strength to wind up the webbing 31 by the retractor based on the collision speed calculated by the ECU 201. With the present embodiment, the seat belt device 30 is integrated with the seat 10, but this is by no means limiting. For example, the wrap anchor may be fixed to the side wall surface of a side sill; the shoulder anchor may be provided on the side wall of a center pillar; and the retractor may be provided in the center pillar.

<Posture Correction Device 40>

The posture correction device 40 is configured to change the angle of the seat back 12 to correct the posture of the passenger P to a predetermined posture, when the ECU 201 detects collision possibility. In addition, the posture correction device 40 may change the angle of the seat cushion 11, when the ECU 201 detects collision possibility. Moreover, the posture correction device 40 may change the angle of each of the seat back 12 and the seat cushion 11, when the ECU 201 detects collision possibility.

Moreover, a plurality of airbags may be provided in the seat back 12, and the posture correction device 40 may deploy a predetermined airbag to correct the posture of the passenger P, when the ECU 201 detects collision possibility. Furthermore, the posture correction device 40 may not necessarily be provided in the seat 10, but may be a predetermined airbag deploying from the front or the side of the vehicle 1 to correct the posture of the passenger P to a predetermined posture. Here, the posture correction of the passenger P is not limited to by the airbag or by adjusting the angle of the seat.

<Seat Moving Device 50>

FIGS. 2A to 2C are cross-sectional views schematically illustrating the seat moving device 50. FIG. 2A is a cross-sectional view illustrating a side part of the seat moving device; FIG. 2B is a cross-sectional view viewed from arrows A-A of FIG. 2A; and FIG. 2C is a cross-sectional view viewed from arrows B-B, of FIG. 2A. As illustrated in FIGS. 2A to 2C, the seat moving device 50 is formed as a slide rail, and includes an outer rail 51, an inner rail 52, a seat fastener 53, a seat moving inflator 54, and a seat moving airbag body 55.

The outer rail 51 has a groove extending in the front-to-back direction of the vehicle 1. The groove of the outer rail 51 has concave portions 51a, 51b, 51c. and 51d configured to fix the seat 10. Here, an upper body airbag body 112 of the upper body airbag device 110, which will be described later, is deployed in a basic deployment volume or an extended deployment volume. When the upper body airbag body 112 is deployed in the basic deployment volume, the seat 10 is fixed at the concave portion 51a, and this position is referred to as "basic position." Meanwhile, when the upper body airbag body 112 is deployed in the extended deployment volume, the seat 10 is fixed at one of the concave portions 51b, 51c and 51d, and this position is referred to as "extended deployment position." Here, even when the upper body airbag body 112 is deployed in the extended deployment volume, the seat 10 remains fixed at the concave portion 51a, depending on the default position of the seat 10, which is set by the seat slider 20.

The inner rail 52 is fixed to the lower part of the seat 10. In addition, the inner rail 52 is fitted in the groove of the outer rail 51. By this means, the inner rail 52 can slide in the groove of the outer rail 51 in the front-to-back direction of the vehicle 1. In addition, the inner rail 52 includes a fastener storage 52a, and the seat fastener 53 is stored in the lower part of the fastener storage 52a.

The seat fastener 53 is stored in the fastener storage 52a of the inner rail 52, and an end part 53a of the seat fastener 53 protrudes from the inner rail 52 in a normal situation. In addition, the seat fastener 53 is controlled by the ECU 201 such that the seat fastener 53 is placed in a completely stored state and a protruding state. Here, the completely stored state means that the seat fastener 53 stored in the fastener storage 52a and the end part 53a does not protrude from the lower surface of the inner rail 52. Meanwhile, the protruding state means that the end part 53a protrudes from the lower surface of the inner rail 52.

Therefore, when the seat fastener 53 protrudes and is fitted in one of the concave portions 51a, 51b, 51c and 51d, the position of the seat 10 is fixed hereinafter referred to as "fixed state"). On the other hand, when the seat fastener 53 is completely stored, the inner rail 52 can slide in the groove of the outer rail 51, and therefore the seat 10 can move in the front-to-back direction of the vehicle 1 (hereinafter referred to as "movable state"). The switching control between the completely stored state and the protruding state of the seat fastener 53 may be realized by a mechanical component. For example, the seat fastener 53 may be protruded from the fastener storage 52a and stored in the fastener storage 52a by a motor. Alternatively, the seat fastener 53 may be moved by means of magnetic force, electromagnetic force, hydraulic pressure, and so forth.

The seat moving inflator 54 ignites explosives upon receiving an actuating signal sent based on collision possibility of the vehicle 1 by the ECU 201, and generates gas by the chemical reaction due to combustion. The gas generated by the seat moving inflator 54 is injected into the seat moving airbag body 55.

The seat moving airbag body 55 has a pouch shape into which the gas is injected by the seat moving inflator 54. When the seat moving airbag body 55 is not actuated, it is compactly folded. When the gas is injected from the seat moving inflator 54 into the seat moving airbag body 55, the seat moving airbag body 55 expands and deploys along the groove of the outer rail 51. Therefore, when the seat moving inflator 54 is actuated in the completely stored state of the seat fastener 53, the seat moving airbag body 55 expands, and therefore the inner rail 52 moves in the groove of the outer rail 51 toward the back part of the vehicle 1. By this means, the seat 10 is moved to the back part of the vehicle 1. Here, the seat fastener 53 is placed in the protruding state and fitted in one of the concave portions 51a, 51b, 51c, and 51d of the outer rail 51 during the movement of the inner rail 52 in the groove of the outer rail 51, the seat 10 is fixed at the concave portion in which the seat fastener 53 is fitted.

The mechanism to move the seat 10 by the seat moving inflator 54 and the seat moving airbag body 55 may be realized by using, for example, a motor, magnetic force, electromagnetic force, and hydraulic pressure. In addition, as described above, the seat moving device 50 is configured to fix the seat 10 at the basic position or the extended deployment position. In one embodiment, the seat moving device 50 may serve as a "seat fixing device".

<Car-Mounted Camera 60>

The car-mounted camera 60 is configured to detect the sitting state such as a posture of the passenger P sitting on the seat 10. In one embodiment, the car-mounted camera 60 may serve as a "posture detector". Here, the posture detector is not limited to the car-mounted camera 60, but may detect the posture of the passenger P by using, for example, a pressure sensor provided in the seat sensor 10. In addition, the car-mounted camera 60 may detect the position of the passenger P sitting on the seat 10, for example, the position of the seat 10. In one embodiment, the car-mounted camera 60 may serve as a "passenger's position detector".

Alternatively, the car-mounted camera 60 may merely capture images of the inside of the passenger compartment including the passenger P, and output the data of the captured image to the ECU 201. Then, the posture and the sitting position of the passenger P may be detected by the ECU 201. Here, the car-mounted camera 60 may be used to capture the surrounding environment of the vehicle 1 and the inside of the vehicle compartment, in combination with a drive recorder camera configured to capture collision images of the vehicle 1.

<Upper Body Airbag Device 110>

The upper body airbag device 110 is controlled by the ECU 201 (ACU) to protect the head and the chest of the passenger P. The upper body airbag device 110 includes an upper body inflator 111, and the upper body airbag body 112.

<Upper Body Inflator 111>

The upper body inflator 111 ignites explosives upon receiving an actuating signal sent based on collision detection or collision possibility of the vehicle 1 by the ECU 201, and generates gas by the chemical reaction due to combustion. The gas generated by the upper body inflator 111 is injected into the upper body airbag body 112. The upper body inflator 111 may include a plurality of inflators, and set the number of inflators to generate gas based on the collision speed calculated by the ECU 201. In addition, the upper body inflator 111 may be configured to adjust an amount of gas to be generated, and control the amount of gas to be generated depending on the collision speed calculated by the ECU 201.

<Upper Body Airbag Body 112>

The upper body airbag body 112 has a pouch shape into which the gas is injected by the upper body inflator 111. When the upper body airbag body 112 is not actuated, it is compactly folded. When the gas is injected from the upper body inflator 111 into the upper body airbag body 112, the upper body airbag body 112 expands and deploys from the dashboard 5 toward the seat 10 to absorb the impact of a collision of the vehicle 1 on the head and the chest of the passenger P.

Moreover, the upper body airbag body 112 may be deployed in more than one size. That is, the upper body airbag body 112 may be deployed in different sizes. For example, the upper body airbag body 112 is fastened at a plurality of points by tethers, and the volume of deployment is changed by cutting an appropriate tether depending on a designated size of the deployed upper body airbag body 112. The tether may be cut by, for example, the upper body inflator 111. With the present embodiment, the upper body airbag body 112 may be deployed in four sizes: the basic deployment volume; a first extended deployment volume; a second extended deployment volume; and a maximally extended deployment volume. Hereinafter, the first extended deployment volume, the second extended deployment volume, and the maximally extended deployment volume other than the basic deployment volume maybe collectively referred to as "extended deployment volume."

<Knee Airbag Device 120>

The knee airbag device 120 is controlled by the ECU 201 (ACU) to mainly protect the legs of the passenger P. In addition, the knee airbag device 120 includes a knee inflator 121 and a knee airbag body 122. Here, when the passenger protection apparatus 101 is actuated, the space between the passenger P and the dashboard 5 (vehicle equipment) is filled with the upper body airbag body 112 and the knee airbag body 122. In addition, as described later, the knee airbag body 122 deploys under the upper body airbag body 112, and supports the upper body airbag body 112 from below.

<Knee Inflator 121>

The knee inflator 121 ignites explosives upon receiving an actuating signal sent based on collision detection or collision possibility of the vehicle 1 by the ECU 201, and generates gas by the chemical reaction due to combustion. The gas generated by the knee inflator 121 is injected into the knee airbag body 122. Here, the knee inflator 121 may have various functions like the upper body inflator 111, depending on a change in the size of the deployed knee airbag body 122 as described later.

<Knee Airbag Body 122>

The knee airbag body 122 has a pouch shape into which the gas is injected by the knee inflator 121. When the knee airbag body 122 is not actuated, it is compactly folded. When the gas is injected from the knee inflator 121 into the knee airbag body 122, the knee airbag body 122 expands and deploys from the dashboard 5 toward the seat 10 to mainly protect the knees of the passenger P.

The deployed knee airbag body 122 contacts the knees of the passenger P and expands upward to support the upper body airbag body 112 deploying above the knee airbag body 122 from below. In addition, the knee airbag body 122 can deploy in a plurality of sizes depending on the size of the deployed upper body airbag body 112. That is, the knee airbag body 122 can deploy in different sizes. Here, with the present embodiment, the knee airbag body 122 can deploy in four sizes corresponding to the sizes of the deployed upper body airbag body 112. However, the knee airbag body 122 may be deployed in a smaller variety of sizes than the upper body airbag body 112. That is, the four volumes of the deployed upper body airbag body 112 are grouped into two volumes, for examples, the basic deployment volume and the first extended deployment volume are grouped into one volume, and the second extended deployment volume and the maximally extended deployment volume are grouped into one volume, and the knee airbag body 122 may be deployed in two sizes corresponding to those two volumes of the upper body airbag body 112.

<Under-Leg Airbag Device 130>

The under-leg airbag device 130 is controlled by the ECU 201 (ACU) to deploy the airbag between the passenger P and the seat 10. In addition, the under-leg airbag device 130 includes an under-leg inflator 131 and an under-leg airbag body 132. The under-leg airbag device 130 is provided in the lower part of the seat 10 and moved with the seat 10. Here, the under-leg airbag device 130 may be fixedly provided in the under floor 3. However, it is preferred to move the under-leg airbag device 130 with the seat 10 to make it easy to keep the under-leg airbag device 130 held between the seat 10 and the passenger P.

<Under-Leg Inflator 131>

The under-leg inflator 131 ignites explosives upon receiving an actuating signal sent based on collision detection, preferably, collision possibility of the vehicle 1 by the ECU 201, and generates gas by the chemical reaction due to combustion. The gas generated by the under-leg inflator 131 is injected into the under-leg airbag body 132.

<Under-Leg Airbag Body 132>

The under-leg airbag body 132 has a pouch shape into which the gas is injected by the under-leg inflator 131. When the under-leg airbag body 132 is not actuated, it is compactly folded. When the gas is injected from the under-leg inflator 131 into the under-leg airbag body 132, the under-leg airbag body 132 is deployed between the lower part of the seat 10 and the legs such as calves of the passenger P and then expands upward.

Therefore, the under-leg airbag body 132 can fill the gap between the legs of the passenger P and the lower part of the seat 10, and function as a cushioning material. That is, when the knee airbag body 122 is deployed toward the legs of the passenger P, the legs of the passenger P does not directly contact the seat 10 but the under-leg airbag body 132 intervenes between the legs and the seat 10. By this means, it is possible to reduce a burden on the passenger P.

<ECU 201>

The ECU 201 is configured to control the entire vehicle 1. The ECU 201 includes a CPU (central processing unit), a ROM (read only memory) configured to store control programs executed by the CPU, data tables, commands and data, a RAM (random access memory) configured to temporarily store data, an EEPROM (electrically erasable and programmable read only memory) which is a type of non-volatile rewritable memory, and an I/O interface circuit. The ECU 201 controls the entire vehicle 1.

The ECU 201 performs collision possibility and collision detection based on information from an acceleration sensor (G sensor), a distance sensor, an impact sensor (pressure sensor) and so forth, and calculates the collision speed. In one embodiment, the ECU 201 may serve as a "collision speed detector". Here, the acceleration sensor, the distance sensor, and the impact sensor may be provided outside and separately from the ECU 201. Moreover, the ECU 201 may acquire the information inputted from those sensors based on the image data inputted from the car-mounted camera 60.

The ECU 201 inputs the position of the seat 10 from the seat slider 20, and detects the position of the passenger P sitting on the seat 10. In one embodiment, the ECU 201 may serve as a "passenger's position detector". Here, the ECU 201 may detect the position of the passenger P based on the image data inputted from the car-mounted camera 60 without the information from the seat slider 20.

The ECU 201 determines the size of the deployed upper body airbag body 112, based on the collision speed calculated from the results of the collision possibility and the collision detection. In one embodiment, the ECU 201 may serve as an "airbag deployment determination unit". For example, when the collision speed is equal to or lower than a speed for a predetermined basic deployment, the ECU 201 determines to deploy the upper body airbag body 112 in the basic deployment volume. Meanwhile, when the collision speed is higher than the speed for the predetermined basic deployment, the ECU 201 determines to deploy the upper body airbag body 112 in the extended deployment volume.

With the present embodiment, when the collision speed is higher than the speed for the basic deployment and equal to or lower than a speed for the first extended deployment, the ECU 201 determines to deploy the upper body airbag body 112 in the first extended deployment volume. In addition, when the collision speed is higher than the speed for the first extended deployment and equal to or lower than a speed for the second extended deployment, the ECU 201 determines to deploy the upper body airbag body 112 in the second extended deployment volume. When the collision speed is higher than the speed for the second extended deployment, the ECU 201 determines to deploy the upper body airbag body 112 in the maximally extended deployment volume.

Moreover, the ECU 201 actuates the upper body inflator 111 of the upper body airbag device 110, the knee inflator 121 of the knee airbag device 120, and the under-leg inflator 131 of the under-leg airbag device 130 to deploy the upper body airbag body 112, the knee airbag body 122, and the under-leg airbag body 132, respectively, based on the collision detection, the collision possibility, and the collision speed. In one embodiment, the ECU 201 may serve as a "deployment controller".

In a case in which the posture of the passenger P is not a predetermined posture, for example, an upright posture when collision possibility is detected, the ECU 201 actuates the posture correction device 40 to correct the posture of the passenger P.

Moreover, the ECU 201 determines the amount of movement of the seat 10, based on the determined size (volume) of the deployed upper body airbag body 112 and the detected position of the seat 10. Then, the ECU 201 actuates the seat moving inflator 54 of the seat moving device 50 and also actuates the seat fastener 53. To be more specific, the ECU 201 controls such that the seat fastener 53 protruding into the concave portion 51*a* is completely stored once, and after the inner rail 52 is moved, the seat fastener 53 protrudes into the concave portion 51*b*, 51*c*, or 51*d* which is appropriate for the determined extended deployment volume.

That is, the ECU 201 first causes the seat fastener 53 protruding into the concave portion 51*a* to be completely stored in the fastener storage 52*a* of the inner rail 52, and then actuates the seat moving inflator 54. Next, after the outer rail 51 is moved with the seat 10 to the back part of the vehicle 1 due to the actuation of the seat moving inflator 54, the ECU 201 causes the seat fastener 53 to protrude into the concave portion 51*b*, 51*c* or 51*d* which is appropriate for the determined extended deployment volume. That is, the ECU 201 causes the seat fastener 53 to protrude from the fastener storage 52*a* of the inner rail 52.

<Operation of Passenger Protection Apparatus 101>

Figure 4:
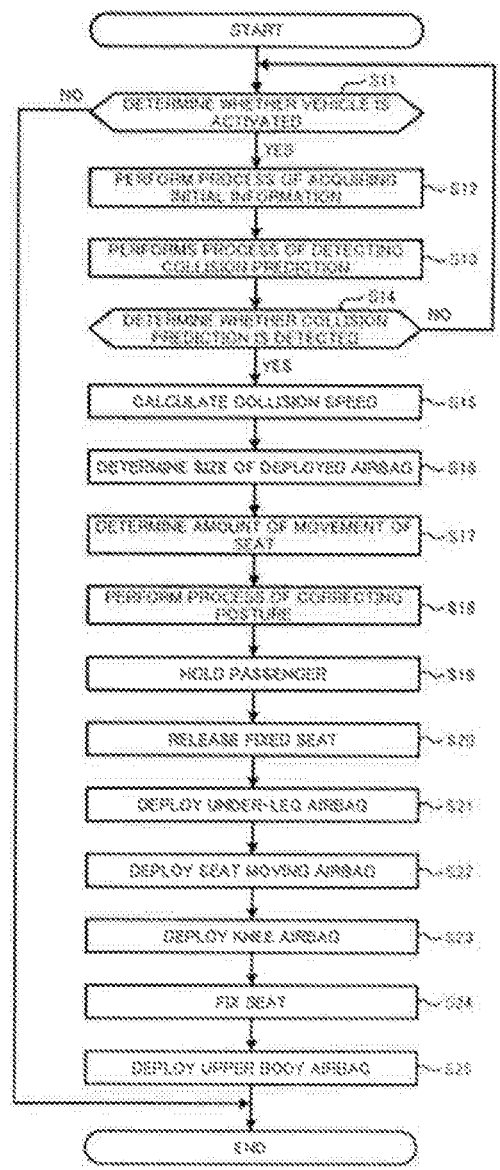
FIG. 4 is a flowchart illustrating an outline of the operation of the passenger protection apparatus.

Next, the operation of the passenger protection apparatus 101 will be described. FIG. 4 is a flowchart illustrating an outline of the operation of the passenger protection apparatus 101.

In the passenger protection apparatus 101, upon determining that the vehicle 1 is activated (step S11) the ECU 201 performs a process of acquiring initial information (step S12). In this process of acquiring initial information, the ECU 201 acquires information on the sitting position and the posture of the passenger P. That is, the ECU 201 acquires the information on the position of the seat 10 in the front-to-back direction, and on whether the passenger P sits straight. This process of acquiring initial information may be always performed, but may be performed at predetermined intervals or performed only when a predetermined condition is met. For example, the ECU 201 may acquire the initial information only when there is a predetermined change.

Next, the ECU 201 performs a process of detecting collision possibility (step S13). To be more specific, the ECU 201 detects collision possibility of the vehicle 1 based on the traveling direction, the vehicle speed, and the acceleration of the vehicle 1, the outside environment such as the road environment, buildings, obstacles, and mobile objects such as other vehicles and pedestrians. Next, the ECU 201 determines whether collision possibility of the vehicle 1 is detected (step S14). When determining that collision possibility of the vehicle 1 is not detected, the ECU 201 repeats the above-described processes.

When determining that collision possibility of the vehicle 1 is detected, the ECU 201 calculates the collision speed (step S15). Here, the ECU 201 may perform this calculation of the collision speed with the process of detecting collision possibility described above. Next, the ECU 201 determines the size of the deployed upper body airbag body 112, based on the calculated collision speed (step S16).

For example, when the collision speed is equal to or lower than a speed for a predetermined basic deployment, the ECU 201 determines to deploy the upper body airbag body 112 in the basic deployment volume. Meanwhile, when the collision speed is higher than the speed for the predetermined basic deployment, the ECU 201 determines to deploy the upper body airbag body 112 in the extended deployment volume. In addition, when the collision speed is higher than the speed for the basic deployment and equal to or lower than a speed for the first extended deployment, the ECU 201 determines to deploy the upper body airbag body 112 in the first extended deployment volume. Moreover, when the collision speed is higher than the speed for the first extended deployment and equal to or lower than a speed for the second extended deployment, the ECU 201 determines to deploy the upper body airbag body 112 in the second extended deployment volume. When the collision speed is higher than the speed for the second extended deployment, the ECU 201 determines to deploy the upper body airbag body 112 in the maximally extended deployment volume.

Next, the ECU 201 determines the amount of movement of the seat 10 based on the determined size of the upper body airbag body 112 and the position of the seat 10 (step S17). For example, when the seat 10 is set within a predetermine range by the seat slider 20, the ECU 201 sets data to cause the seat fastener 53 to move to and protrude into the concave portion 51*b*, 51*c* or 51*d*, based on the determined size of the upper body airbag body 112. Therefore, when the upper body airbag body 112 is deployed in the first extended deployment volume, the seat fastener 53 is moved to the concave portion 51*b*; when the upper body airbag body 112 is deployed in the second extended deployment volume, the seat fastener 53 is moved to the concave portion 51*c*; and the upper body airbag body 112 is deployed in the maximally extended deployment volume, the seat fastener 53 is moved to the concave portion 51*d*.

On the other hand, when the seat 10 is set behind the predetermined range by the seat slider 20, the ECU 201 sets a fixed position depending on the default position. For example, when the seat 10 is set one step behind the predetermined range by the seat slider 20, the ECU 201 sets data to cause the seat fastener 53 to move to and protrude into the concave portion 51*c* even though it is determined that the upper body airbag body 112 is deployed in the maximally extended deployment volume. In addition, when the seat 10 is set two steps behind the predetermined range, the ECU 201 sets data to cause the seat fastener 53 to move to and protrude into the concave portion 51*d*.

Next, when determining that the collision possibility of the vehicle 1 is detected, the ECU 201 performs a process of correcting the posture of the passenger P (step S18). Here, when the passenger P does not sit in a predetermined posture, for example, an upright posture, the ECU 201 changes the angle of the seat back 12 back to a prescribed angle. Here, it is preferred that the detection and the determination of the posture of the passenger P is performed before the determination that the collision possibility is detected, during the process of acquiring initial information, in view of the processing speed. However, the detection of the posture of the passenger P may be performed after the determination that the collision possibility is detected. In this case, it is possible to detect the latest posture of the passenger P, and therefore to perform accurate determination. Alternatively, only the determination of the posture may be performed after the determination that the collision possibility is detected.

The ECU 201 causes the seat belt device 30 to hold the passenger P on the seat 10 (step S19). To be more specific, when determining that the collision possibility is detected, the ECU 201 outputs a winding signal to the retractor of the seat belt device 30. Upon receiving the winding signal from the ECU 201, the retractor is actuated to wind the webbing 31. In one embodiment, when the ECU 201 determines that collision possibility of the vehicle 1 is detected, the webbing 31 of the seat belt device 30 is wound to hold the passenger P on the seat 10.

Next, the ECU 201 causes the seat moving device 50 to release the fixed seat 10 (step S20). Here, the ECU 201 does not cause the seat slider 20 to release the seat 10, but causes the seat moving device 50 to move the seat 10 with the seat slider 20 as described later. To be more specific, upon detecting collision possibility of the vehicle 1, the ECU 201 controls such that the seat fastener 53 of the seat moving device 50 is removed from the concave portion 51*a* to completely store the seat fastener 53 in the fastener storage 52*a* of the inner rail 52. By this means, it is possible to move the seat 10 along the groove of the outer rail 51.

Next, the ECU 201 deploys the under-leg airbag body 132 (step S21). To be more specific, the ECU 201 outputs an actuating signal to the under-leg inflator 131 of the under-leg airbag device 130. Upon receiving the actuating signal from the ECU 201, the under-leg inflator 131 generates gas, and injects the generated gas into the under-leg airbag body 132.

When the gas is injected from the under-leg inflator 131 into the under-airbag body 132, the under-leg airbag body 132 protrudes from the lower part of the seat 10 to a vicinity of the calves of the passenger P. The under-leg airbag body 132 has a shape to expand upward from the vicinity of the calves of the passenger P by further injecting the gas from the under-leg inflator 131 into the under leg airbag body 132. Then, the under-leg airbag body 132 reaches the back part of the knees or the back part of thighs of the passenger P, and spreads through the gap between the legs of the passenger P and the lower part of the seat 10. In this way, the under-leg airbag body 132 is expanded and deployed to fill the gap between the legs of the passenger P and the lower part of the seat 10, and to prevent the legs of the passenger P from directly touching the seat 10 even when the knee airbag body 122 pushes the legs of the passenger P from the front. Consequently, the under-leg airbag body 132 can function as a cushioning material.

In addition, the ECU 201 deploys the seat moving airbag body 55 of the seat moving device 50 (step S22). To be more specific, the ECU 201 outputs an actuating signal to the seat moving inflator 54 of the seat moving device 50. Upon receiving the actuating signal from the ECU 201, the seat moving inflator 54 generates gas, and injects the generated gas into the seat moving airbag body 55.

When the gas is injected from the seat moving inflator 54 into the seat moving airbag body 55, the seat moving airbag body 55 expands and deploys along the groove of the outer rail 51 toward the back part of the vehicle 1. Then, the seat moving airbag body 55 contacts the inner rail 52, and moves the inner rail 52 with the seat 10 along the groove of the outer rail 51 toward the back part of the vehicle 1. By this means, the seat 10 is moved to the back part of the vehicle 1 by the seat moving airbag body 55. Here, at this time, the legs of the passenger P are pushed up by the under-leg airbag body 132 and float from the under floor 3, so that the friction between the under floor 3 and the passenger P can be eliminated or reduced. Therefore, it is possible to smoothly move the seat 10.

Next, the ECU 201 deploys the knee airbag body 122 (step S23). To be more specific, the ECU 201 outputs an actuating signal to the knee inflator 121 of the knee airbag device 120. Upon receiving the actuating signal from the ECU 201, the knee inflator 121 generates gas, and injects the generated gas into the knee airbag body 122.

When the gas is injected from the knee inflator 121 into the knee airbag body 122, the knee airbag body 122 is expanded and deployed from the lower part of the dashboard 5 toward the back part of the vehicle 1, for example, toward the knees of the passenger P. Then, the knee airbag body 122 reaches the knees of the passenger P and fills the space between the dashboard 5 (vehicle equipment) of the vehicle 1 and the passenger P under the upper body airbag body 112. Here, while expanding and deploying to the knees of the passenger 2, the knee airbag body 122 also is expanded and deployed upward by the gas injected from the knee inflator 121 and has a predetermined pressure. In addition, the ECU 201 deploys the knee airbag body 122 in a predetermined size corresponding to that of the deployed upper body airbag body 112. By this means, it is possible to appropriately fill the gap which tends to be generated by increasing the size of the deployed upper body airbag body 112. Here, as described above, the sizes of the deployed knee airbag body 122 may correspond to those of the deployed upper body airbag body 112 one-to-one. Alternatively, the sizes of the deployed knee airbag body 122 may be smaller in number than the sizes of the deployed upper body airbag body 112.

Next, the ECU 201 fixes the seat 10 to the predetermined position (step S24). To be more specific, when the seat fastener 53 moving with the seat 10 is positioned at the concave portion 51a, 51b, 51c, or 51d which is set based on the determined amount of movement of the seat 10, the ECU 201 causes the seat fastener 53 to protrude from the fastener storage 52a. By this means, the seat fastener 53 is fitted in the set concave portion 51a, 51b, 51c or 51d to fix the seat 10.

Next, the ECU 201 deploys the upper body airbag body 112 in a predetermined size (step S25). To be more specific, the ECU 201 outputs an actuating signal to the upper body inflator 111 of the upper body airbag device 110 based on the determined size of the upper body airbag body 112. Upon receiving the actuating signal from the ECU 201, the upper body inflator 111 generates gas, and injects the generated gas into the upper body airbag body 112.

In addition, the upper body inflator 111 cuts a predetermined tether for the upper body airbag body 112 based on the actuating signal outputted based on the determined size of the upper body airbag body 112 to change the volume of deployment of the upper body airbag body 112. Here, as described above, the upper body airbag device 110 may include a plurality of inflators, and change the volume of deployment of the upper body airbag body 112 according to the number of actuated inflators. Alternatively, the volume of deployment of the upper body airbag body 112 may be changed by changing the amount of gas injected from the upper body inflator 111.

When the gas is injected from the upper body inflator 111, the upper body airbag body 112 expands and deploys from the upper part of the dashboard 5 toward the back part of the vehicle 1, for example, toward the upper body such as the head and the chest of the passenger P. As described above, the volume of deployment of the upper body airbag body 112 is determined based on the collision speed, and therefore it is possible to protect the passenger P with an appropriate volume of deployment depending on the collision state. For example, when the collision speed is high, the size of the deployed upper body airbag body 112 is increased to absorb the impact on the passenger P over a long distance. Therefore, it is possible to prevent the passenger P from being subject to a sudden impact even though the impact of the collision is high, and consequently to safely protect the passenger P.

In addition, as described above, the knee airbag body 122 is deployed under the upper body airbag body 112. Therefore, even though the size of the deployed upper body airbag body 112 is increased and deployed long, it is possible to prevent the upper body airbag body 112 from falling down or moving in an unexpected direction, and to surely receive the reaction force. Consequently it is possible to appropriately protect the passenger P.

Here, with the present embodiment, the upper body airbag body 112 is deployed after the seat 10 is fixed, but this is by no means limiting. The upper body airbag body 112 may be deployed before the seat 10 is fixed. In addition, when a collision is detected even during a series of operations, the upper body airbag body 112 and the knee airbag body 122 are immediately deployed. Moreover, the movement of the seat 10 and the deployment of the airbags have been described in the basic sequence, but this is by no means limiting. Predetermined processes may be performed at the same time, or the movement and the deployment may be performed in other sequences.

As described above, the passenger protection apparatus according to the present embodiment determines the size of the deployed upper body airbag body 112 depending on the collision speed to move the seat 10, and appropriately deploys the knee airbag body 122 between the vehicle equipment and the passenger P under the upper body airbag body 122. Therefore, it is possible to appropriately protect the passenger P depending on the situation, and surely receive the reaction force even though the size of the deployed upper body airbag body 112 is increased, and consequently to surely protect the passenger P by the upper body airbag body 112.

In one embodiment, the upper body airbag body 112 may serve as a "first airbag body" and the knee airbag body 122 may serve as a "second airbag body". In one embodiment, the seat moving device 50 may serve as a "seat moving unit".

The invention claimed is:

1. A passenger protection apparatus for a vehicle comprising:
   a first airbag deployable in different sizes;
   a second airbag deployable between the first airbag and vehicle equipment;
   an airbag deployment device configured to deploy the first airbag and the second airbag;
   a collision speed detector configured to detect a collision or collision possibility of the vehicle, and calculate a collision speed;
   a passenger's position detector configured to detect a position of a passenger sitting on a seat;
   a seat moving unit configured to move the seat;
   an airbag deployment determination unit configured to determine a size of the deployed first airbag on a basis of a result of the detection by the collision speed detector; and
   a deployment, controller configured to determine an amount of movement of the seat on a basis of the size of the deployed first airbag determined by the airbag deployment determination unit and the position of the passenger detected by the passenger's position detector, cause the seat moving unit to move the seat, and cause the airbag deployment device to deploy the first airbag and the second airbag.

2. The passenger protection apparatus for a vehicle according to claim 1, further comprising:
   a posture detector configured to detect a posture of the passenger; and
   a posture correction device configured to correct the posture of the passenger to an upright posture,
   wherein, when the posture of the passenger detected by the posture detector is not the upright posture, the deployment controller causes the posture correction device to correct the posture of the passenger to the upright posture, and then causes the airbag deployment device to deploy the first airbag.

3. The passenger protection apparatus for a vehicle according to claim 2, further comprising a seat fixing device configured to fix the seat at a basic position and an extended deployment position for extended deployment of the first airbag, wherein
   the airbag deployment determination unit determines that the first airbag is deployed in a basic deployment volume or an extended deployment volume greater than the basic deployment volume, on the basis of the result of the detection by the collision speed detector, and
   when the airbag deployment determination unit determines that the first airbag is deployed in the extended deployment volume, the seat fixing device releases the seat fixed at the basic position, and then fixes the seat at the extended deployment position.

4. The passenger protection apparatus for a vehicle according to claim 3, wherein
when determining the extended deployment volume, the airbag deployment determination unit determines a predetermined extended deployment volume, from among a plurality of extended deployment volumes, on the basis of the result of the detection by the collision speed detector, and
the seat fixing device has a plurality of extended deployment positions, and fixes the seat at the extended deployment position depending on the predetermined extended deployment volume determined by the airbag deployment determination unit.

5. The passenger protection apparatus for a vehicle according to claim 1, further comprising a seat fixing device configured to fix the seat at a basic position and an extended deployment position for extended deployment of the first airbag, wherein
the airbag deployment determination unit determines that the first airbag is deployed in a basic deployment volume or an extended deployment volume greater than the basic deployment volume, on the basis of the result of the detection by the collision speed detector, and
when the airbag deployment determination unit determines that the first airbag is deployed in the extended deployment volume, the seat fixing device releases the seat fixed at the basic position, and then fixes the seat at the extended deployment position.

6. The passenger protection apparatus for a vehicle according to claim 5, wherein
when determining the extended deployment volume, the airbag deployment determination unit determines a predetermined extended deployment volume, from among a plurality of extended deployment volumes, on the basis of the result of the detection by the collision speed detector, and
the seat fixing device has a plurality of extended deployment positions, and fixes the seat at the extended deployment position depending on the predetermined extended deployment volume determined by the airbag deployment determination unit.

7. A passenger protection apparatus for a vehicle comprising:
a first airbag deployable in different sizes;
a second airbag deployable between the first airbag and vehicle equipment;
a seat moving unit configured to move a seat; and
circuitry configured to
deploy the first airbag and the second airbag,
detect a collision or collision possibility of the vehicle, and calculate a collision speed,
detect a position of a passenger sitting on the seat,
determine a size of the deployed first airbag on a basis of a result of the detection, and
determine an amount of movement of the seat on a basis of the determined size of the deployed first airbag and the detected position of the passenger, cause the seat moving unit to move the seat, and cause the airbag deployment device to deploy the first airbag, and the second airbag.

* * * * *